US010439808B2

(12) United States Patent
Alleaume (10) Patent No.: US 10,439,808 B2
(45) Date of Patent: Oct. 8, 2019

(54) COMMUNICATION WITH EVERLASTING SECURITY FROM SHORT-TERM-SECURE ENCRYPTED QUANTUM COMMUNICATION

(71) Applicant: INSTITUT MINES-TELECOM, Paris (FR)

(72) Inventor: Romain Alleaume, Paris (FR)

(73) Assignee: INSTITUT MINES-TELECOM, Paris (FR)

(*) Notice: Subject to any disclaimer, the term of this patent is extended or adjusted under 35 U.S.C. 154(b) by 53 days.

(21) Appl. No.: 15/532,953

(22) PCT Filed: Jan. 8, 2016

(86) PCT No.: PCT/EP2016/050305
§ 371 (c)(1),
(2) Date: Jun. 2, 2017

(87) PCT Pub. No.: WO2016/110582
PCT Pub. Date: Jul. 14, 2016

(65) Prior Publication Data
US 2017/0346627 A1    Nov. 30, 2017

(30) Foreign Application Priority Data

Jan. 9, 2015    (EP) .................................... 15305017
Oct. 1, 2015    (EP) .................................... 15187905

(51) Int. Cl.
*H04L 9/08*      (2006.01)
*H04J 14/02*     (2006.01)

(52) U.S. Cl.
CPC ........ *H04L 9/0858* (2013.01); *H04J 14/0227* (2013.01); *H04L 9/0844* (2013.01); *H04L 9/0852* (2013.01); *H04L 2209/24* (2013.01)

(58) Field of Classification Search
None
See application file for complete search history.

(56) References Cited

U.S. PATENT DOCUMENTS

| 2005/0152540 A1* | 7/2005 | Barbosa ................ H04L 9/0858 380/28 |
| 2010/0239250 A1* | 9/2010 | Gisin .................... H04L 9/0858 398/45 |

(Continued)

FOREIGN PATENT DOCUMENTS

WO    2005/046114 A2    5/2005

OTHER PUBLICATIONS

Cosmo Lupo et al., "Robust quantum data locking from phase modulation," Physical Review A (Atomic, Molecular, and Optical Physics), vol. 90, No. 2, Aug. 29, 2014, XP055260904.

(Continued)

*Primary Examiner* — Brandon S Hoffman
(74) *Attorney, Agent, or Firm* — Baker & Hostetler LLP (57) ABSTRACT

A method of communicating a classical message M between a first party A and a second distant party B over a public channel F, comprises the steps of sharing a key between the parties, the shared key K comprising a short-term-secure key KS and/or a long-term-secure key KL; at A, encoding M as a quantum codeword, A using K to encode M into a first encrypted codeword belonging to a publicly known quantum code; communicating the first encrypted codeword from A to B over F whose output is a second codeword; unitarily transforming the second codeword into a third codeword by using a N-mode interferometer controlled by B, placed at the output of F and keyed by K; determining an estimate of M, at B, by performing a measurement on the third codeword and by processing the measurement using K.

18 Claims, 4 Drawing Sheets

(56) References Cited

U.S. PATENT DOCUMENTS

2013/0089204 A1 4/2013 Kumar et al.
2013/0089206 A1 4/2013 Englund et al.

OTHER PUBLICATIONS

"Quantum Safe Cryptography and Security: An Introduction, benefits, enablers and challenges," Quantum Safe Cryptography V1.0.0, Oct. 6, 2014, pp. 1-49, XP055146959.
Christian Weedbrook et al., "Gaussian Quantum Information," Arxiv.org, Cornell University Library, Oct. 14, 2011, XP080533027.
Valerio Scarani et al., "The Security of Practical Quantum Key Distribution," Arxiv.org, Cornell University Library, Feb. 28, 2008, XP080402341.
Romain Alleaume et al., "SECOQC White Paper on Quantum Key Distribution and Cryptography," Arxiv.org, Cornell University Library, Jan. 23, 2007, XP080269269.

\* cited by examiner

COMMUNICATION WITH EVERLASTING SECURITY FROM SHORT-TERM-SECURE ENCRYPTED QUANTUM COMMUNICATION

CROSS-REFERENCE TO RELATED APPLICATIONS

This application is a National Stage of International patent application PCT/EP2016/050305, filed on Jan. 8, 2016, which claims priority to foreign European patent application Nos. EP 15305017.4, filed on Jan. 9, 2015 and EP 15187905.3, filed on Oct. 1, 2015, the disclosures of which are incorporated by reference in their entirety.

TECHNICAL FIELD

The invention relates to the field of quantum cryptography.

BACKGROUND

The creation and the distribution of cryptographic keys is a prerequisite for encrypted communications. Quantum key distribution (QKD) can be used to produce and distribute cryptographic keys, but not to transmit any message data. One significant advantage of QKD, compared to computationally secure key distribution techniques, is that there exist QKD protocols for which the security can be formally established in an information-theoretic setting. Even when some computational techniques are used for authentication purposes of the classical channel, QKD can guarantee everlasting security.

Everlasting security, for a key establishment protocol, in particular implies that once the protocol ends and the keys are distributed, their security cannot be jeopardized at any point in the future, irrespectively of the progresses in computing power or in cryptanalysis made by any potential attacker. Such strong security guarantee cannot be obtained with computational techniques.

Despite being capable of offering everlasting security, QKD presents limitations in terms of performance and resource requirements. As of today, QKD can be reliably deployed over metropolitan distances (below 80 kilometers). Long distance QKD is possible for distances up to a few hundreds of kilometers over optical fibers, but the achievable key rates are then low or insufficient for specific uses. It is moreover hard to deploy QKD over long distances with reliability as the requirements on detector noise, post-processing efficiency and system stability all increase with distance.

As a noticeable limitation, QKD is not compatible with optical amplifiers. As a consequence, in absence of reliable quantum repeaters, the distance reachable using QKD can only be extended beyond the reach of a single QKD link using classical trusted repeaters. Such repeaters require specific measures, in general complex and costly, to guarantee their security. QKD with trusted repeaters thus does not fit with the paradigm of end-to-end security and this constitutes a limitation. QKD presents other limitations.

The patent document WO2005046114, published in 2005 and entitled "*Coherent-states based quantum data-encryption through optically-amplified WDM communication networks*" discloses a quantum cryptographic protocol which uses two-mode coherent states that is optically amplifiable, resulting in a polarization independent system that is compatible with the existing WDM infrastructure and which provides secure data encryption suitable for wavelength division multiplexing networks through an in-line amplified line. The security of this scheme is intrinsically related to the security of an underlying cipher that is computationally secure. The security advantage of such scheme over computationally secure encryption, and in particular everlasting security cannot be established. Hence this approach presents limitations.

There is a need for methods and systems for communicating a message M between distant parties A and B with everlasting security, and in particular for which untrusted repeaters can be realized.

SUMMARY

There is disclosed a method of communicating a classical message between a first party and a second distant party over a public channel, comprising the steps of sharing a key between said parties, said shared key comprising a short-term-secure key and/or a long-term-secure key; encoding at the first party the classical message as a quantum codeword, the first party using the shared key to encode the classical message into a first encrypted codeword belonging to a publicly known quantum code; communicating the first encrypted codeword from the first party to the second party over the public channel whose output is a second codeword; unitarily transforming the second codeword into a third codeword by using a N-mode interferometer controlled by the second party, placed at the output of the public channel and keyed by the shared key; determining an estimate of the classical message, at the second party, by performing a measurement on the third codeword and by processing said measurement using the shared key.

In an embodiment, there is disclosed a method of communicating a long-term-secure classical message M between distant parties Alice (A) and Bob (B) by sharing a short-term-secure classical key K between A and B and by using a public quantum channel and a classical authenticated channel. In an embodiment, a classical message is long-term-secure if the accessible information of any eavesdropper Eve (E) about the message can be upper bounded by a quantity which can be chosen arbitrary close to zero and if said bound remains valid at all time; and a classical message is short-term-secure during a time duration tau if the accessible information of any eavesdropper E about the message can be upper bounded by a quantity which can be chosen arbitrary close to zero and if this bound is valid during a time interval of duration at least tau. Described developments comprise steps of sharing a short-term-secure key K between A and B over the classical authenticated channel; encoding the classical message M at A into a quantum state, using the short-term-secure key K and sending the quantum state to B over the quantum channel; decoding the message M at B, using K and the quantum state received at the output of the quantum channel. Further embodiments comprise the use of computationally-secure public-key and/or symmetric-key encryption, the use of an error correction code, the use of product of coherent states at input, the use of single-mode (adaptative or non-adaptative) coherent or direct detection receivers. System and software aspects are described.

Advantageously, the disclosed quantum cryptographic protocol—mixing classical and quantum cryptography—offers a comprehensive security model under which one can explicitly define the achievable performance of the protocol on a given channel, against quantum a attacker with given resources and attack strategy.

Advantageously in some embodiments, compared to computationally-secure encryption, A and B, using a quantum channel and a short-term secure key K, can achieve long-term security and even composable information-theoretic security if the eavesdropper cannot store quantum information coherently during a time larger than the time tau during which the exchanged key K is short-term secure.

Advantageously in some embodiments, compared to QKD where a secure random key is shared, A and B can securely share a deterministic message M.

Advantageously, embodiments of the invention enable an <<extended security>>: the use of an error correction code during the quantum encoding allows reaching increased performance compared to QKD: larger tolerable channel losses, higher tolerable channel error rate, larger encoder and receiver noise, no need for a feedback channel.

Advantageously in some embodiments, in particular when compared to QKD, A and B do not even need to perform measurements at B in order to upper bound the information captured by E, since this bound depends only on the state sent by A.

Advantageously in some embodiments, in particular when compared to QKD, the method is compatible with optical channels that contain optical amplifiers and with WDM optical networks.

In some embodiments, the disclosed methods and systems advantageously enable some controllability. For example parameters such as (n, alpha) associated to some embodiments of the method can be tuned to optimize the performance (e.g. achievable communication rate R given a correctness parameter epsilon) on a given channel (characterized by loss and error rate).

Advantageously, embodiments of the invention can be implemented without excessive efforts and costs, with minimal hardware changes to existing telecom components and systems (for example by using phase modulation of coherent states and homodyne detection which are now widely used in long-distance coherent classical communications).

Advantageously, embodiments of the invention allow to perform optimal measurements and to reach or approach the classical capacity for communications over the quantum channel between A and B, while being implementable with practical existing receivers, i.e. can be reduced to practice with current technology.

In some embodiments, the disclosed invention can be implemented directly with existing coherent communication emitters, phase modulators and receivers.

Advantageously, embodiments of the invention enable security of "data at flight" (e.g. data flows, during data transport) with applications to security of "data at rest" (e.g. key management for data storage in data centers, cloud computing data warehouses, etc).

Advantageously, some embodiments of the invention can be implemented in fiber optics networks, including WDM optical networks and networks containing optical amplifiers, or in satellite networks. Applications range from military purposes to general and domestic ones (e.g. banks, governments, voting machines, cryptographic currencies, e-commerce, etc).

In an embodiment, there is disclosed a method of communicating a message between distant parties A and B, comprising the step of using a computationally secure encryption function Enc to encrypt product state or non-entangled quantum codewords, wherein Enc is short-term secure for a time at least tau_enc, while any information stored in a quantum memory totally decoheres in time tau_Q strictly inferior to tau_enc. Developments comprise the use of long-term secure symmetric keys, quantum data locking, short-term secure ephemeral shields, BPSK encoding, physical limitations L of the energy of incoming signals, Hadamard codes over a BPSK alphabet, and compensation for propagation losses. System aspects describe the use of interferometers, single-symbol receivers, single photon detectors, homodyne and heterodyne detectors, Kennedy receivers, Dolinar receivers and quantum-nulling receivers.

Advantageously, embodiments of the invention enable "post-quantum" security models, i.e. allowing key distribution protocols with everlasting security and in particular security against an attacker operating a quantum computer.

Advantageously, embodiments of the invention combine the properties of super-additivity of structured codes and quantum data locking.

Advantageously, embodiments of the invention lift one of the main limitations of the existing quantum data locking schemes, that rely on random codes that are not efficiently decodable.

Advantageously, embodiments of the invention enable long-distance secure communication or key distribution with everlasting security Advantageously, embodiments of the invention can be implemented with minimal hardware changes to existing telecom components and systems.

There is disclosed a method and explicit protocols of communicating securely a classical message M between distant parties A and B over a lossy and/or noisy public quantum channel F, comprising the step of using a classical-quantum encoding C to encode M into an optical codeword, on N modes, as a product of N coherent states with low photon numbers treated as qubits, and the step of encrypting the information carried on the qubits by performing single-mode unitary transformations indexed by a key stream KS shared between A and B using through a computationally secure mechanism. Upon reception of the (noisy) quantum codeword, B combines the N received modes using N-mode optical interferometer composed of beam splitters and phase shifters. B uses KS to apply some single-mode unitary transformations within the interferometer paths. The overall effect of this KS keyed-interferometer I is used both to undo the encryption at the qubit level and to obtain multimode interference, so that the code C composed of multimode codewords used by A is mapped unitarily onto a code C' composed of single-mode codewords and can thus be detected in practice with existing detectors.

According to the invention, in a framework named "ESQUIMO" (for "Encryption Stronger than Quantum noisy Memory"), according to which the quantum storage time tau_Q(N), during which the fraction of retrievable classical information encoded on a quantum codeword of length N decays by at least ½, is such that, for some N, tay_Q(N)<<tau_enc, said time tau_enc being the time during which computational encryption techniques used to derive KS can be considered secure.

There are disclosed explicit protocols (Message M, encoding C, phase encryption of optical codewords with KS, interferometer I, optical receiver and post-processing by Bob) such that Eve information IE on M can be bounded below the information shared between Alice and Bob over the channel F, under the ESQUIMO framework (or model).

Possible encodings C over multimode products of coherent states include repetition code over BPSK or M-ary PSK modulated coherent states; Hadamard code over BPSK modulated coherent states There is disclosed a protocol and an explicit design to realize untrusted repeaters for the encoding C consisting in a repetition code over M-ary PSK modulation. Such repeaters for example can be placed on the channel F to compensate for losses. In an aspect of the invention, for appropriate parameters (of the encoding, repeater, decoding), the security of the A-B communication with respect to an attacker (including a malicious receiver) cannot be compromised although the repeaters are not trusted.

The disclosed method and protocols allow establishing an effective classical wiretap channel between Alice and Bob. Classical wiretap coding (outer codes) can then be used to communicate reliably and securely classical information between A and B, at a rate that depends on the characteristics of the quantum channel F, and on the protocol (encoding C, interferometer I, optical receiver and decoding strategy for Bob).

System aspects describe the use of phase modulators, phase sensitive amplifiers (PSA), phase insensitive amplifier (PIA), multimode bosonic interferometers composed of phase shifters and beamsplitters, single photon detectors, homodyne and heterodyne detectors, Kennedy receivers, Dolinar receivers and quantum-nulling receivers.

Advantageously, embodiments of the invention rely solely on symmetric encryption techniques for the derivation of short-term secrets and therefore enable everlasting secure communication against "post-quantum" adversaries.

Advantageously, embodiments of the invention can use shot-term secure encryption to obfuscate the coherence relations between the different modes to bound Eve's accessible information on M.

Advantageously, embodiments of the invention can combine the property of super-additivity of structured codes and short-term secure encryption, thereby bounding Eve accessible information.

Advantageously, embodiments of the invention can combine the properties of quantum data locking codes with short-term secure encryption, thereby bounding Eve accessible information.

Advantageously, embodiments of the invention can lift one of the main limitations of the existing quantum data locking schemes, and is furthermore implementable with structured quantum data locking codes.

Advantageously, embodiments of the invention can enable secure communication, with everlasting security Advantageously, embodiments of the invention can use phase-sensitive amplifiers or phase-insensitive amplifiers to realize untrusted repeaters, capable of compensating losses and therefore to enable secure communications with everlasting security and non-vanishing rates over unbounded distances.

Advantageously, embodiments of the invention can be implemented with limited hardware changes to existing telecom components and systems, and in particular with much more noisy detectors compared to the detectors required for long-distance QKD Advantageously, embodiments of the invention enable security of "data at flight" (e.g. data flows, during data transport) with applications to security of "data at rest" (e.g. key management for data storage in data centers, cloud computing data warehouses, etc).

Advantageously, some embodiments of the invention can be implemented in fiber optics networks, including WDM optical networks and networks containing optical amplifiers, or in satellite networks. Applications range from military purposes to general and domestic ones (e.g. banks, governments, voting machines, cryptographic currencies, e-commerce, etc).

There are disclosed practical systems and methods of securely communicating a message between distant parties with everlasting security.

Advantageously, the everlasting security property of the disclosed methods and systems can be formally established (i.e. proved according to mathematical logic).

Advantageously, embodiments of the invention enable new security models that go beyond the criteria of unconditional security targeted by QKD.

Advantageously, the disclosed methods and systems can be qualified as being "practical", i.e. implementable with existing hardware and/or capable of obtaining comparable or better performance than QKD with fewer resources.

BRIEF DESCRIPTION OF DRAWINGS

Embodiments of the present invention will now be described by way of example with reference to the accompanying drawings in which like references denote similar elements, and in which.

DETAILED DESCRIPTION

The present patent application entitled "COMMUNICATION WITH EVERLASTING SECURITY FROM SHORT-TERM-SECURE ENCRYPTED QUANTUM COMMUNICATION" is an improvement patent application of EP15187905.3 filed Oct. 1, 2015 entitled "PRACTICAL QUANTUM CRYPTOGRAPHY WITH EVERLASTING SECURITY", which itself is an improvement patent of the patent application EP15305017.4 filed Jan. 9, 2015 entitled "HYBRID CLASSICAL QUANTUM CRYPTOGRAPHY", the contents of which are incorporated herein.

The "Accessible information" or Iacc(M; rho) is defined by the maximum classical mutual information (maximization over all possible local measurements on quantum state rho) that can be learned from the quantum state rho about the classical message M.

A classical message is long-term-secure if the accessible information of any eavesdropper E about the message can be upper bounded by a quantity that can be chosen arbitrary close to zero and if this bound remains valid at all time.

A classical message is short-term-secure during a time duration tau if the accessible information of any eavesdropper E about the message can be upper bounded by a quantity that can be chosen arbitrary close to zero and if this bound is valid during a time interval of duration at least tau.

Under the realistic hypothesis that the eavesdropper E holding the quantum state rho_E has no quantum memory, or even has a quantum memory that decoheres in a short time, then a long-term secure communication protocol (quantified by a negligible accessible information available to an eavesdropper) can be transformed into a communication protocol for which composable information-theoretic security holds A "computationally secure" (CS) system is a secure system assuming that any adversaries are computationally limited, as all adversaries are in practice. Because hardness of a problem is difficult to prove, in practice certain problems are "assumed" to be difficult (computational hardness assumption). A non-exhaustive list of some of common cryptographic hardness assumptions or problems for example comprises integer factorization, the RSA problem (stronger than factorization), the quadratic residuosity problem (stronger than factorization), the decisional composite residuosity assumption (stronger than factorization), the higher residuosity problem (stronger than factorization), the Phi-hiding assumption (stronger than factorization), the discrete log problem (DLP), the computational Diffie-Hellman assumption (CDH; stronger than DLP), the decisional Diffie-Hellman assumption (DDH; stronger than CDH) and the shortest Vector Problem.

The impossibility of differentiating between non-orthogonal states is a fundamental principle of quantum mechanics.

In physics, in quantum mechanics, a "coherent state" corresponds to an eigenvectors of the harmonic oscillator Hamiltonian. Such states are of high importance, in particular in optics, since a laser (operated well over threshold) typically produces states of light that can be described as coherent states of light.

The step of "encoding" classical information (x) over a quantum state Psi means that a unitary operation Ux (that depends on x) is applied onto the quantum state Psi.

The step of decoding information X encoded on a quantum state rho refers to the step of performing measurements (possible joint measurements) on rho and possibly of performing subsequent classical post-processing on the obtained measurement results in order to build an estimator for X.

There is disclosed a (computer-implemented) method of communicating a long-term-secure classical message M between distant parties A and B by sharing a short-term-secure classical key K between A and B and by using a public quantum channel and a classical authenticated channel.

According to an aspect of the invention, there is disclosed an "hybrid" security model (i.e. combining classical cryptography and quantum cryptography in a particular manner). Embodiments of the disclosed invention for example enable to construct secure two-party cryptographic primitives. Such developments comprise for example bit commitment, coin tossing or XOR computing. By extension, such two-party cryptographic protocols can then be used to construct any secure multi-party protocols.

In a development, a classical message is long-term-secure if the accessible information of any eavesdropper E about the message can be upper bounded by a quantity which can be chosen arbitrarily close to zero and if said bound remains valid at all time.

In a development, a classical message is short-term-secure during a time duration tau if the accessible information of any eavesdropper E about the message can be upper bounded by a quantity which can be chosen arbitrarily close to zero and if this bound is valid during a time interval of duration at least tau.

In a development, the method comprises the steps of sharing a short-term-secure key K between A and B over the classical authenticated channel; encoding the classical message M at A into a quantum state, using the short-term-secure key K and sending the quantum state to B over the quantum channel; decoding reliably the message M at B, using K and the quantum state received at the output of the quantum channel.

In a development, the short-term secure key K can be renewed regularly. A can use a secure random generator (for example a quantum random number generator) to generate a key stream S and can then transmit S securely to B, using the previously described method, the key stream S. The key stream S can then be used to replace K.

In a development, the step of sharing the short-term-secure key K from A to B relies on or comprises computationally-secure public-key encryption.

In an embodiment, A can encrypt K with the public key of B and can send it to B over the classical authenticated channel. In an embodiment, A and B can initially share a pre-shared long-term-secure key Kseed. A and B both can use a computationally secure symmetric-key encryption algorithm to expand Kseed into K.

In a development, the computationally secure encryption scheme comprises a block and/or stream cipher. In an embodiment, AES 128 is used. In an embodiment AES 256 is used. In some embodiments, algorithms such as Twofish, Serpent, AES (Rijndael), Blowfish, CAST5, RC4, 3DES, Skipjack, Safer+/++ and IDEA can be used (and also combination thereof).

In a development, the step of sharing the short-term-secure key K from A to B comprises a step of distributing a key Kseed with |Kseed|<<|K| with a computationally-secure public-key encryption and a step of expanding Kseed into K with a symmetric-key encryption.

In a development, the step of encoding M into a quantum state at A is performed by encoding M into a product state of size n, communicated via n uses of the quantum channel and wherein the measurements performed at B during the step of decoding are individual or copy-by-copy measurements of each of the n channel outputs.

According to an aspect of the invention, the security from the protocol can be based on the fact that an eavesdropper is limited by a quantum memory of short lifetime, cannot learn the coherent information and is thus limited to the accessible information of the obfuscated state. This accessible information can be upper bounded by a small quantity. On the other hand, B can deobfuscate and measure the successive channel outputs using local operations, possibly adaptatively, and can estimate or determine the information sent by A. In some embodiments, said information can be closed to optimal information.

In a development, the step of encoding the message M at A comprises a step of optically encoding the message M into a product of n quantum coherent states of light, with a total photon number equal to $n*alpha^2$.

In a development, the step of encoding at A the message M into a product of n quantum coherent states of light comprises a step of modulating each coherent state at A in phase and/or in amplitude.

In a development, the key K is composed of $n*p$ bits, where p is an integer larger than 1; said short-term-secure key K being used to determine n angles {Theta1, Theta2, ..., Thetan} with a resolution $2Pi/2^p$. In a development, the message M is associated with |M| distinct values, with a length in bits equal to $k=\log_2|M|$. In a development, the step of encoding of message M at A into an optical quantum codeword, using the short-term-secure key K comprises the steps of applying a secret sharing scheme S and subsequently an error correcting code C to encode the message M of k bits into a classical codeword c(M) of l bits; encoding optically the classical codeword c(M) of l bits, wherein $l=n*m$, into a product of n phase-encoded pulses, each being a coherent state of amplitude alpha and of phase chosen from a M-ary phase constellation, encoding m bits; and applying a phase rotation of angle Theta_i (i=1 ... n) to each of the n pulses.

These steps define the encoding of M into an optical quantum codeword of length n, that is an product state of n coherent states, n optical pulses, sent on the quantum channel by making n uses of the channel.

In a development, the step of decoding at B the received optical quantum codeword into an estimate of M, by using the short-term-secure key K comprises the steps of:

applying the inverse phase rotations of angle −Theta_i (i=1 . . . n) to ith received optical pulse; performing subsequently individual or adaptative coherent measurements on each of then optical pulses; and determining the message M from the n measurements.

In a development, the method further comprises a step of generating ns shares of the message M considered as an input according to a secret sharing scheme S (t, ns) so that the knowledge of at least t of the ns shares are necessary to recover the message M.

Secret sharing (also called secret splitting) refers to methods for distributing a secret amongst a group of n participants (e.g. A, B, C, D, etc), each of whom is allocated a share of the secret. The secret can be reconstructed only when a sufficient number, of possibly different types, of shares are combined together; individual shares are of no use on their own. Each participant is given a share in such a way that any group of t (for threshold) or more participants can together reconstruct the secret but no group of fewer than t participants can. Such a system is called a (t, n)-threshold scheme. Increasing t will increase the required size of the quantum memory to attack embodiments of the invention, and thus will increase the difficulty of such an attack. In some embodiments, information theoretically-secure secret sharing schemes is used. In some embodiments, computationally secure secret sharing schemes is used. In an embodiment, an homomorphic secret sharing is used. In some embodiments, a Blakley's scheme (geometric scheme) and/or a Shamir's scheme (e.g. polynomial interpolation) and/or a Chinese Remainder Theorem (e.g. Mignotte and Asmuth-Bloom) is used. In an embodiment, the secret sharing scheme is proactive. In an embodiment, the secret sharing scheme is verifiable.

It is underlined that secret sharing is a primitive in several protocols for secure multiparty computation.

In a development, the method further comprises a step of using an error correcting code C to encode the message M into a larger message M2.

An error correcting code for example can use redundancy, allowing to recover the message M with the required correctness, even if the channel is noisy. In some embodiments, the parameters of the error correcting code C can be adapted to the quantum channel parameters (e.g. loss and noise). Capacity-reaching and efficiently decodable family of codes, such as LDPC codes or Turbo-codes (e.g. with low decoding complexity), Convolutional codes or Polar codes optionally can be used (and combination thereof).

In a development, the length of the message M equals 1 bit; the secret sharing scheme comprises one share; the error correcting code C is a repetition code of length I or n and the M-ary phase encoding is a binary phase encoding.

In an embodiment, k equals 1 i.e. the message M is a bit. A trivial secret scheme means for example that there is one share. The repetition code can be of length I equal to n. A binary-phase encoding means that m equals 1 for a M-ary encoding. For example, a binary phase can be BPSK.

In a development, the computationally secure encryption scheme comprises a block and/or stream cipher.

In a development, the performance of the protocol used to communicate a classical message M of log 2|M| (bits) from A to B is associated with 4 parameters (R, n, alpha, epsilon), wherein: n is the number of uses of the quantum channel in one run of the protocol; R is the communication rate at which secure information can be sent from A to B; with R=log 2|M|/n; alpha$^2$ is the mean number of photons sent on the quantum channel in one run of the protocol; epsilon is the correctness of the protocol, wherein the step of decoding at B of the message M is performed with a probability superior than 1-epsilon, while the accessible information to an eavesdropper E about the message M is upper bounded by epsilon.

On the one hand, increasing the mean number of photons alpha$^2$ will typically increase the amount of information shared with B, but also the information leaked to E. On the other hand, increasing n only decreases the information leaked to E. Therefore, to guarantee a given security level (parameter epsilon), n has to increase when alpha$^2$ increases; the product n*alpha$^2$ being bounded below 1. Increasing n for fixed product n*alpha$^2$ allows to increase the distance over which reliable and secure communication (with correctness epsilon) can be performed. These are examples of parameters which can be used to control the communication protocols according to the disclosed methods and systems.

For a fixed quantum channel $N_{AB}$, characterized by transmission T and a given error model (quantified here by a parameter Xi). The achievable rate R decreases with decreasing T and with increasing error parameter Xi. The achievable rate R decreases with decreasing epsilon. The achievable epsilon decreases with n.

The communication rate can be expressed in bits per channel use, for example. The communication rate (for example of secure bits of message transmitted per second) can be inferior to the rate achievable for phase-modulated classical communication with the same hardware, on the same channel. This can in particular be due to the redundancy (parameter n).

There is disclosed a computer program comprising instructions for carrying out one or more steps of the method when said computer program is executed on a suitable computer device.

There is disclosed a system comprising means adapted to carry out one or more steps of the method.

In a development, the system comprises a laser at A operated in continuous wave regime; an amplitude modulator placed after the laser, to modulate the n pulses, each one being a coherent state of amplitude alpha; a phase modulator placed after the laser, to modulate phase shifts Theta1, Theta2, . . . Thetan and the binary BPSK modulation; at least one optical quantum channel from A to B; at least one classical channel from A to B; a phase modulator at B; a coherent receiver at B (which can be adaptative or non-adaptative); and computing means at A and B.

In an embodiment, the temporal coherence of the laser at A can be high enough to guarantee a stable phase relation over n channel uses. In an embodiment, the coherent receiver at B is adaptative. In an embodiment, the coherent receiver is non-adaptative.

In a development, the discrimination of a multicopy coherent state from a binary modulation comprises adaptative individual measurements.

In a development, the discrimination of a multicopy coherent state from a binary modulation is performed with a Dolinar receiver, consisting of adaptative displacement and photon counting. Such a Dolinar receiver is optimal to discriminate between a binary modulation on coherent states.

In a development, adaptative individual measurements are performed with a Dolinar receiver, or a Bondurant II receiver, or a Becerra receiver, or a Sequential Waveform Nulling receiver or a combination thereof.

In a development, the discrimination of a multicopy coherent state from a binary modulation comprises non-adaptative individual measurements.

In a development, non-adaptative individual measurements are performed with an homodyne receiver, or a heterodyne receiver, or a Kennedy receiver, or a Bondurant I receiver or a combination thereof.

In an embodiment, there is disclosed a security model for quantum cryptography, exploiting the assumption that any quantum memory is bound to decohere in a finite time $T_{enc}$ during which symmetric encryption can be considered perfect, i.e. cannot be distinguished from a random function, while it could be broken for $t>T_{enc}$.

Figure 1:
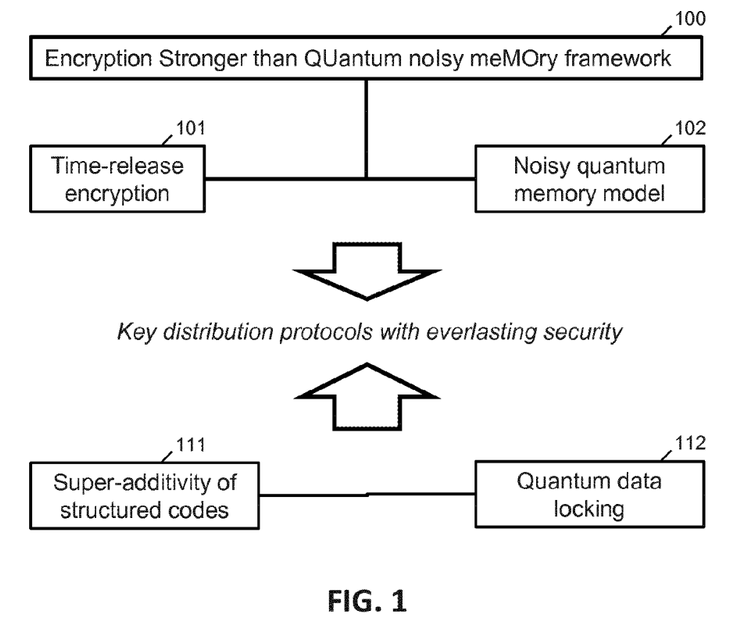
FIG. 1 provides a general overview of a security model according to the invention.

The FIG. 1 provides a general overview of a security model according to the invention.

This model (or framework) 100, called esquimo (Encryption Stronger than Quantum noisy meMOry), can be seen as a combination of time-release encryption 101 with a noisy quantum memory model 102.

Even though this model departs from information-theoretic security (only at short time scale, where computational security is assumed to hold), it presents at least a double interest:

1) it is based on a realistic assumption, namely that AES-like encryption functions cannot be broken in a time shorter than the decoherence time of the best quantum memories;

2) it is a "post-quantum" security model, since only (short-term) security of symmetric cryptography is assumed, and allows to build key distribution protocols with everlasting security.

The esquimo framework opens advantageous and unexplored possibilities for quantum cryptography. This can be illustrated by proposing a protocol for key distribution that is practically implementable with today's technology and can strongly improve over QKD fundamental rate-loss trade-off by exploiting super-additivity of structured codes 111 and quantum data locking 112.

Recent work on quantum data locking, whose security is based considering the accessible information clearly illustrates that a relaxation of the composable security criteria that is now commonly used in QKD can allow to design new quantum cryptographic protocols for secure communications, with improved performances.

Composable security of quantum data locking can moreover be obtained against an adversary with a finite-time quantum memory and thus in the esquimo framework.

In addition, the assumption that a perfect short-term (ephemeral) symmetric encryption function exists allows to go one step further and to lift one of the main limitations of the existing quantum data locking schemes: such schemes rely on random coding constructions for which there is not known how to design a practical decoder.

To the contrary, there is disclosed to use explicit constructions of super-additive codes for the lossy bosonic channel and to exploit the unitary equivalence of such codes, over the binary phase-shift keying (BPSK) alphabet, with pulse-position-modulation (PPM) codes. The ephemeral encryption can be exploited to obfuscate (by one-time-padding) the BPSK codebook and guarantee uniformity. This obfuscation is only ephemeral but leaves the eavesdropper Eve (whose quantum memory decoheres for $t>T_{enc}$ in esquimo) with no better strategy than performing direct single symbol measurements on the input of the channel. Eve is hence limited to the accessible information Iacc (M; Q) for single symbol measurements while Bob (who can deobfuscate the ephemeral encryption) can use a structured super-additive receiver.

In addition, quantum data locking can be used to reduce Eve's accessible information, namely use k secret bits to hide the structure of the code, provided m (number of bits transmitted per codeword) is larger than the number of bits k of the secret key K used to encode the unitary applied to each codeword.

There is disclosed an optimized and explicit construction of "practical" quantum data locking, relying on the ($2^m-1$, $2^m$, $2^{m-1}$) (length, number of codewords, minimal distance) a Hadamard code. The proposed constructions use k bits for locking and it can be assumed that this can reduce Iacc (M; Q) by a factor $2^k$. For the achievable but challenging value m=16, the maximum reachable distance over the lossy bosonic channel is boosted by the combination of super-additivity gain on the information decodable by Bob Iacc (M; K, Q) and by the locking reduction on Iacc (M; Q), but the rate is constrained by the exponentially decreasing rate of the Hadamard code with m. It leads to an achievable secure key of $10^{-10}$ bits per BPSK symbol, for distances up to 160 km, even with relatively noisy avalanche photodiodes (pd=$10^{-5}$).

Improved codes and modulation formats for key distribution can be used in the esquimo framework.

Embodiments of the invention are now disclosed.

There is disclosed a method comprising the steps of:

using an explicit construction of a super-additive code for a lossy bosonic channel;

exploiting the unitary equivalence of the super-additive code over a binary phase-shift keying (BPSK) alphabet, with a pulse-position-modulation (PPM) code.

In a development, the method further comprises a step of using an ephemeral encryption. Definitions of "ephemeral" have been provided.

In a development, said ephemeral encryption obfuscates by one-time-padding the BPSK codebook thereby guaranteeing uniformity.

In a development, the method further comprises a step of using quantum data locking.

In a development, the step of using quantum data locking comprises the step of using k secret bits to hide the structure of the code, provided the number of bits m transmitted per codeword is larger than the number of bits k of the secret key K used to encode the unitary applied to each codeword.

In a development, the step of using quantum data locking comprises the step of using a Hadamard code.

Figure 2:
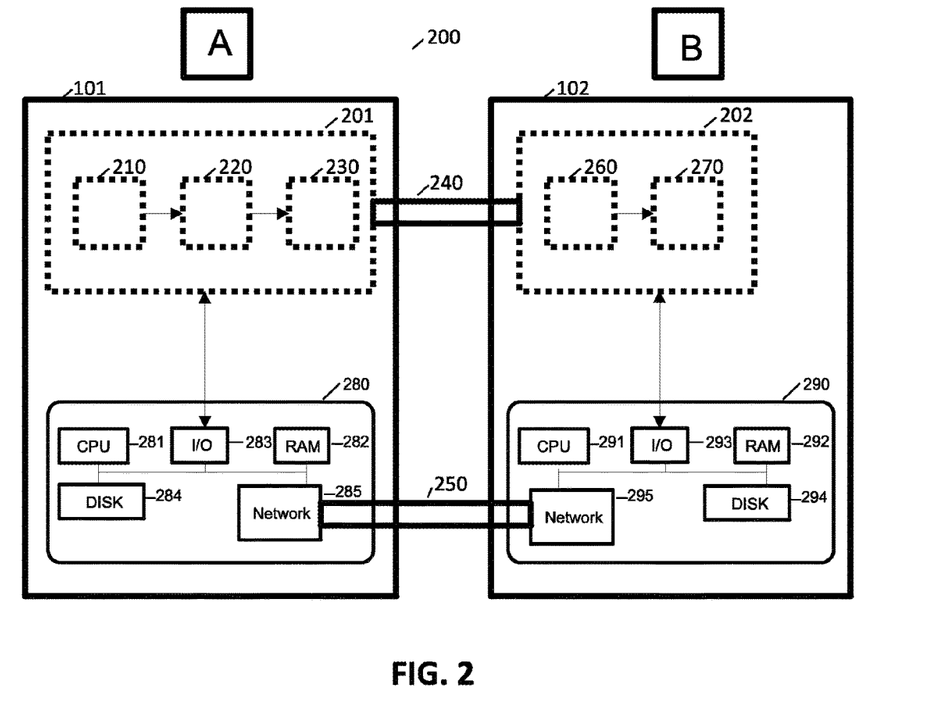
FIG. 2 illustrates some aspects of an exemplary system according to the invention.

FIG. 2 illustrates some aspects of an exemplary system according to the invention.

Regarding hardware (system) aspects of the invention, some specific embodiments of the invention (for example developments C5 and C6 described hereinafter) advantageously can rely on the property of super-additivity of the detection at B (while E is forced to measure symbol by symbol). Nevertheless, as disclosed in the development C1, B can use detectors measuring symbol by symbol but B can perform these measures after having used an interferometer I (which interferometer combines a plurality of symbols towards one symbol). This concrete hardware aspect leads to embodiments (e.g. C5 or C6) which can be reduced to practice relatively easily.

In other words, in an embodiment, the receiver at B can combine an interferometer, a detector (single symbol) and classical (standard) decoding (and post-processing). In yet other words, the receiver at B can be qualified as being a super-additive receiver, but can be manufactured in practice with single-symbol detectors.

The FIG. 2 shows an overview of the system 200 interconnecting distant parties A and B. A is associated with opto-electronics components 201 and computing, storage and communication resources 280. B is likewise associated with opto-electronics components 202 and computing, storage and communication resources 290.

Such opto-electronics components for example can comprise a laser (source) 210 at A 101 operated in continuous wave regime; an amplitude modulator 220 placed after the laser, used to modulate the n pulses, each one being a coherent state of amplitude alpha; a phase modulator 230 placed after the laser, used to modulate phase shifts Theta1, Theta2, . . . Thetan and the binary BPSK modulation; at least one optical quantum 240 channel from A 101 to B 102; at least one classical channel 250 from A 101 to B 102; a phase modulator 260 at B 102; and a coherent receiver 270 (adaptative or non-adaptive) at B 102.

As previously described, in an advantageous embodiment, B can comprise a structured super-additive receiver (made of single-symbol receivers and an interferometer for example)

In general, computing, storage and communication resources 280 at A or computing, storage and communication resources 290 at B can comprise processing means (281, 291) (e.g. one or more CPUs), memory means (282, 292), Input/Output I/O means (283, 293), storage means (284, 294) and network access means (285, 295) said means possibly interacting with one another (caching, swapping, distributed computing, load balancing, etc). The processing means (281, 291) can comprise a CPU (multicore or many-core) or a FPGA or an ASIC, or a combination thereof. The memory means (282, 292) for example comprise one or more of a flash memory or a random access memory. The opto-electronic hardware attached to A or B is interacting with the classical computing, storage and communication means (280, 290) via the I/O means (283, 293). The I/O means (283, 293) for example can comprise digital-to-analog converters (DAC) or analog-to-digital converters (ADC). A digital-to-analog converter (DAC, D/A, D2A or D-to-A) converts digital data (usually binary) into an analog signal (current, voltage, or electric charge). An analog-to-digital converter (ADC) performs the reverse function. The storage means (284, 294) can comprise one or more hard drives or SSDs.

Optionally, the computing, storage and communication means 280 or 290 can comprise means enabling a (graphical) user interface i.e. enabling man-machine interactions. For example, the system can further comprise output peripherals like displays and input peripherals like a mouse or a keyboard (which for example can be used to control the communication rate via associated graphical user interfaces).

In some embodiments, other hardware devices also can be used (not shown), for example one or more optical switches, optical multiplexers, optical demultiplexers, optical amplifiers, beam splitters, optical non-linear elements, optical isolators, filters, optical fuses and other devices. The hardware being used can be suitable (or adapted) to handle high speeds (e.g. from megabytes to terabytes per second) and/or high modulation depth (e.g. 10 bits or above).

The networks interconnecting A and B (i.e. authenticated channel 250 and quantum channel 240) can be wired and/or wireless. In some embodiments, such networks are wireless networks (e.g. Wifi and/or satellite). In some embodiments, the networks are wired networks (e.g. optic fiber and/or ADSL, for example over the Internet). Advantageously, wired networks (i.e. a wired link between A and B) present a reliable connection. In some other embodiments, networks interconnecting A and B can comprise both wireless and wired networks (for example, the authenticated channel can be wireless while the quantum channel is performed by optical fiber).

In an embodiment, A (respectively B) is provided with opto-electronics controlled by FPGA. Advantageously, such an embodiment is compact. In some embodiments, specific ASICs can be used (e.g. mass market production, providing very high speed). Multi-core processors as well as many-core processors can be used.

In some embodiments, the invention is implemented by means of highly integrated photonic chips, for example embedded on small terminals or end devices like smart-phones or smart watches.

The disclosed embodiments can take form of an entirely hardware embodiment (e.g. comprising an FPGA), an entirely software embodiment (for example to control a system according to the invention) or an embodiment containing both hardware and software elements. Software embodiments include but are not limited to firmware, resident software, microcode, etc. Some embodiments of the invention can take the form of a computer program product accessible from a computer-usable or computer-readable medium providing program code for use by or in connection with a computer or an instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

Further embodiments are now discussed.

There is disclosed a method M, a new security model applicable to improve the practicality, and/or the performance and/or the achievability of long-term secure cryptographic primitives, for which there is provided new generic constructions or even new explicit protocols.

The method M comprises the steps of using a computationally secure encryption function Enc to encrypt product state (non-entangled) quantum codewords.

According to one limiting case of the present security model, called ESQUIMO (encryption stronger than quantum noisy memory), Enc is short-term secure for a time at least tau_enc, while any information stored in a quantum memory totally decoheres in time tau_Q<tau_enc. This corresponds to the higher level of abstraction (C0) of the invention.

In a first development (C1 of C0), there are disclosed (new) explicit protocols for practical, long-distance, long-term-secure communication or key distribution between message m sender A and receiver B.

In such a first development:
A and B share a long-term secure symmetric key K=K1∥K2∥Kauth;
A and B can communicate via a public classical channel and a public quantum channel;
A and B authenticate their classical communications with Kauth;
A and B can derive from K a long-term secure symmetric subkey K1, to be used for quantum data locking;
A sends an authenticated nounce n to B;

A and B use the encryptions algorithm Enc, K2 and n to derive a short-term secure ephemeral shield S, consisting of a large pseudo-random bitstring S;

A encodes a message m into a multi-symbol product state classical-quantum code c(m, K1, S), where the symbols are taken from an alphabet consisting of a set of low-energy, non-orthogonal coherent states, like in particular the BPSK encoding, with photon number per pulse smaller or around 1 and where the shield S is used to entirely obfuscate the structure of the code by performing symbol by symbol one-time pad encryption of the classical index of the corresponding symbol.

The multi-symbol codewords can be unitarily transformed, using unitary U, into single letter codewords, and the receiver B can build an reconfigurable interferometric system I to perform the unitary transformation corresponding of removing the shield S and then performing the inverse of the unitary transformation U.

To decode, Bob uses I to unshield and unitarily transform the incoming optical codewords, and performs single-symbol measurements, with practically realizable detectors such as single photon detector, homodyne detector, heterodyne detector, Kennedy receiver, Dolinar receiver, quantum-nulling receiver.

In a second development (C2 of C0), the method M can be used to construct repeaters for long-term secure key distribution/long-term secure communication in the esquimo model achieving the following functionalities:

the repeater stations are not trusted but can have access to the short-term secrets used by the sender to encrypt the quantum codewords in method M;

the repeater stations can be used to compensate for propagation losses, noticeably the repeaters do not use entanglement, nor quantum memory.

In a further development (C4 of C1), the key long-term secure subkey K1 is used for quantum data locking, namely to securely choose one unitary transformation Ulock_K1 from an appropriate set of $2^{|K1|}$ unitaries with appropriate locking properties. There exists appropriate sets such that in the limit of codewords of large size, locking key of size $|K1|=O(\log(n))$ is| sufficient to reduce the accessible information about a message of size n to a value arbitrarily close to zero.

Using quantum data locking, and method M, one can build practical scheme relying on structured codes allowing to send reliably the message m between A and B, while locking and joint decoding gain can be used to guarantee security.

In such schemes, key distribution and secure message passing are done in conjunction, and code parameters are chosen such that the secret key rate is sufficient to renew the LTS secret bits used for quantum data locking.

In a further development (C5 of C1), there is disclosed an explicit construction of secret message passing with repetition codes over BPSK encoding. For example, there is disclosed an explicit construction for secret message passing wherein:

the quantum channel is a bosonic lossy channel, of transmittivity $T=t^2$ (in power);

the classical-quantum code used is a (r, 2, r), (length, dimension, minimal distance) repetition code over the BPSK alphabet {alpha>, |-alpha>};

the interferometer I allows Bob to coherently add r received signal, and perform single symbol measurement with received power $t^2 r^2 |alpha|^2$ at a rate 1/r. The Alice Bob per symbol capacity hence scales up with r.

In the esquimo framework, an attacker is limited to single-symbol accessible information IE<1-h(phell(|alpha|^-2)

wherein phell(|alpha^2|=½(1-sqrt(1-exp(-4*|alpha^2)) is the optimum error discrimination probability for the BPSK symbols.

Eve accessible information on M is approximately sqrt(n) |alpha^2|.

The inner classical-quantum codes induce a classical wiretap channel between Alice and Bob, for which efficient, classical outer can be used, in order to perform secure message passing.

For any distance and corresponding transmittivity T, increasing r always allow to have a positive private capacity, although this capacity scales as 1/r (in absence of repeater).

At a fixed distance, increasing r improves the SNR and allows to operate secure message passing with very noisy detectors.

In a further development (C6 of C1), there is disclosed an explicit construction for secret message passing wherein:

the quantum channel is a bosonic lossy channel, of transmittivity $T=t^2$ (in power);

the classical-quantum code used is a ($2^m-1$, $2^m$, $2^{(m-1)}$) (length, number of codeword, minimal distance) Hadamard code over the BPSK alphabet {alpha>, |-alpha>}, unitarily equivalent to a ($2^m$, m, $2^{(m-1)}$);

The interferometer I is a Green Machine build from m log m beamsplitters and m log m phase shifters, it allows Bob to coherently add concentrate $2^m$ received single symbols into one mode, and perform single symbol measurement with received power $t^2 |2^m*alpha|^2$ at a rate $m/2^m$.

A fraction kl of the m bits sent per codeword is used for locking.

There is disclosed a method of communicating a message between distant parties A and B, comprising the step of using a computationally secure encryption function Enc to encrypt product state or non-entangled quantum codewords, wherein Enc is short-term secure for a time at least tau_enc, while any information stored in a quantum memory totally decoheres in time tau_Q strictly inferior to tau_enc.

In a development, the method comprises the steps of: A and B sharing a long-term secure symmetric key K=K1||K2||Kauth; A and B communicating via a public classical channel and a public quantum channel; A and B authenticating their classical communications with Kauth; A and B deriving from K a long-term secure symmetric subkey K1, to be used for quantum data locking; A sending an authenticated nounce n to B; A and B using the encryptions algorithm Enc, K2 and n to derive a short-term secure ephemeral shield S, comprising a large pseudo-random bitstring S; A encoding a message m into a multi-symbol product state classical-quantum code c(m, K1, S), where the symbols are taken from an alphabet consisting of a set of low-energy and non-orthogonal coherent states, such as the BPSK encoding, with photon number per pulse smaller or around 1 and where the shield S is used to entirely obfuscate the structure of the code by performing symbol by symbol one-time pad encryption of the classical index of the corresponding symbol.

In a development, the method further comprises the steps of transforming the multi-symbol codewords into single letter codewords using unitary U, the step of the receiver B using a reconfigurable interferometric system I to perform the unitary transformation said unitary transformation comprising the steps of removing the shield S and of performing the inverse of the unitary transformation U.

In a development, the method further comprises the step of B using I to unshield and unitarily transform the incoming optical codewords, and to perform single-symbol measurements.

In a development, the method further comprises the steps of obfuscating the structure of an optical circuit, implementing a secret unitary U(kpriv) for a long-term secure key kpriv known only by A, thereby imposing a physical limitation L of the energy of incoming signals, the method comprising the steps of: A using an optical circuit C with hardware measures enforcing limitation L implementing Ukp; A publicly broadcasting the authenticated value of a public key kpub; wherein the circuit C can be adapted, by receiving locally an input of a key k, into a circuit implementing the unitary transformation U (kpriv xor k) that only A can invert.

In a development, the key long-term secure subkey K1 is used for quantum data locking to securely choose one unitary transformation Ulock_K1 from an appropriate set of $2^{|K1|}$ unitaries with selected locking properties, said selected locking properties being such that the accessible information about a message of size n is reduced to a value arbitrarily close to zero.

In a development, for secret message passing with repetition codes over BPSK encoding, the quantum channel is a bosonic lossy channel, of transmittivity $T=t^2$ (in power); the classical-quantum code used is a (r, 2, r), (length, dimension, minimal distance) repetition code over the BPSK alphabet {alpha>, |−alpha>}; the interferometer I allows B to coherently add r received signal, and perform single symbol measurement with received power $t^2 r^2 |alpha|^2$ at a rate 1/r, wherein an attacker is limited to single-symbol accessible information IE<1-h(phell(|alpha|^2); wherein phell(|alpha^2|=½(1-sqrt(1-exp(−4*|alpha|^2)) is the optimum error discrimination probability for the BPSK symbols; and wherein the accessible information by E is independent of r and is bounded by choosing $|alpha^2|\sim 1/r$.

In a development, the quantum channel is a bosonic lossy channel, of transmittivity $T=t^2$ (in power); the classical-quantum code used is a ($2^m-1$, $2^m$, $2^{(m-1)}$) (length, number of codeword, minimal distance) Hadamard code over the BPSK alphabet {alpha>, |−alpha>}, unitarily equivalent to a ($2^m$, m, $2^{m-1}$)); wherein a fraction kl of the m bits sent per codeword is used for quantum locking.

There is disclosed a system comprising means to perform the steps of the method, wherein the system comprises one or more repeater stations, at least one of said stations being not trusted but having access to the short-term secret used by the sender to encrypt the quantum codewords according to the method; wherein said one or more repeater stations compensate for propagation losses according to the method.

In a development, the system comprises one or more of a single photon detector, an homodyne detector, an heterodyne detector, a Kennedy receiver, a Dolinar receiver or a quantum-nulling receiver.

In a development, the system comprises an interferometer I, for example a Green Machine build from m log m beam splitters and m log m phase shifters, which allows Bob to coherently add concentrate $2^m$ received single symbols into one mode, and perform single symbol measurement with received power $t^2 |2^m*alpha|^2$ at a rate $m/2^m$.

Figure 3:
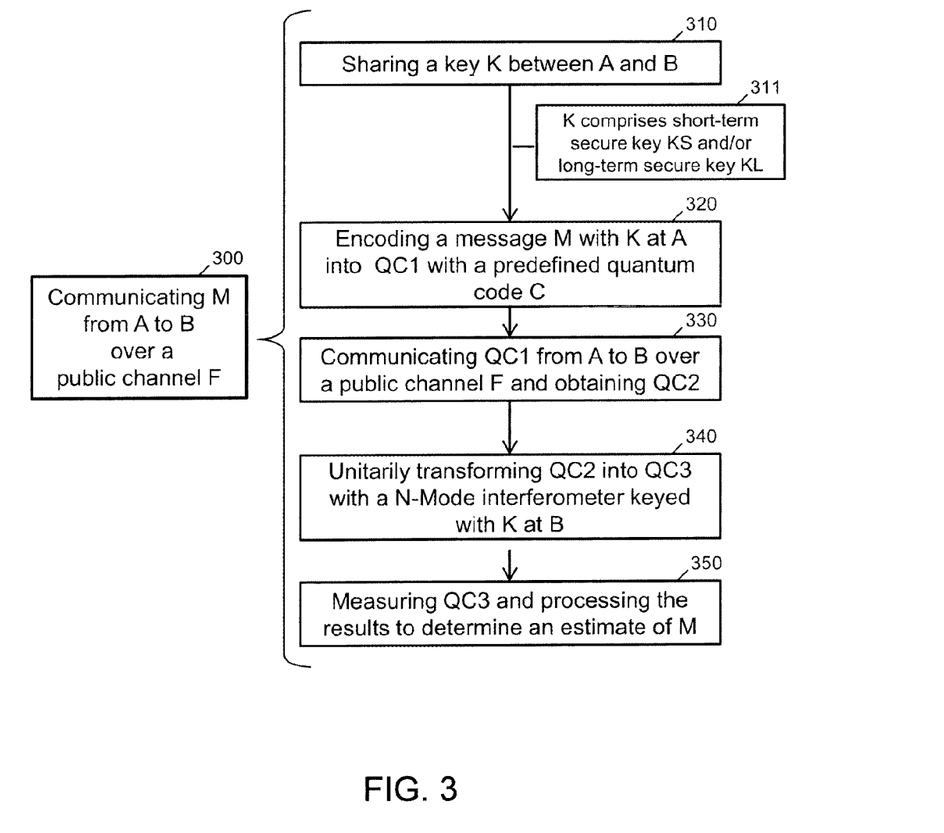
FIG. 3 illustrates an embodiment of the invention.

FIG. 3 illustrates an embodiment of the invention.

There is disclosed a method of communicating a classical message between a first party and a second distant party over a public channel (300), comprising the steps of sharing (310) a key between said parties, said shared key comprising a short-term-secure key and/or a long-term-secure key; encoding (320) at the first party the classical message as a quantum codeword, the first party using the shared key to encode the classical message into a first encrypted codeword belonging to a publicly known quantum code; communicating (330) the first encrypted codeword from the first party to the second party over the public channel whose output is a second codeword; unitarily transforming (340) the second codeword into a third codeword by using a N-mode interferometer controlled by the second party, placed at the output of the public channel and keyed by the shared key; determining (350) an estimate of the classical message, at the second party, by performing a measurement on the third codeword and by processing said measurement using the shared key.

Figure 4:
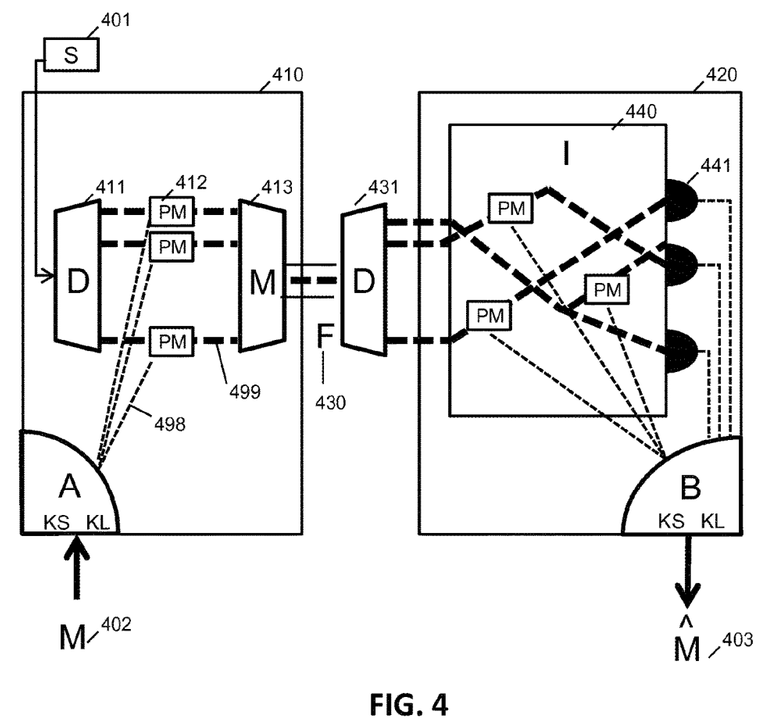
FIG. 4 illustrates some aspects of an exemplary embodiment of the invention.

FIG. 4 illustrates some aspects of an exemplary embodiment of the invention. The figure shows a laser 401; party A secure perimeter 410; party B secure perimeter 420; public channel F 430; a classical message M 402; the estimate of message M 403; demultiplexers 411, 431; multiplexers 413; phase modulators 412; interferometer I 440; quantum channel 499 in bold dotted lines; classical information channels in fine dotted lines 498; single-mode optical detectors 441. The first party A encodes M with KL and/or KS into a multimode optical quantum codeword by the means of N phase modulators, a N-mode interferometer I, at the input of B, is composed of beam-splitters and phased shifters, phase shift values are keyed by KS and KL. The interferometer I transforms the received codeword such that single-mode measurements with single-mode optical detectors are sufficient to perform measurements. The distant party B determines an estimate of M from the measurement results, KS and KL.

There is disclosed a method of communicating a classical message M between distant parties A and B over a lossy and/or noisy public channel F connecting A and B, comprising the steps of sharing a key K between A and B, said key K comprising a short-term-secure key KS and/or a long-term-secure key KL; encoding at A the classical message M as a quantum codeword, A using the shared key K=(KL, KS) to encode the classical message M into an encrypted codeword rho1(M, K) belonging to a publicly known quantum code C; communicating the encrypted codeword rho1(M, K) from A to B over the channel F whose output is codeword rho2(M, K); unitarily transforming rho2 (M, K) into rho3(M, K) by using a N-mode interferometer I controlled by B placed at the output of channel F and keyed by K; determining an estimate Mest of M, locally at B, by performing a measurement on rho3(M, K) and by processing said measurement using the shared key K.

In a development, the step of encoding M into the encrypted codeword rho1(M, KS, KL) comprises the steps of encoding M into a codeword c(M, KL) belonging to a publicly known quantum code C and of using the short-term-secure key KS to perform letter-by-letter encryption U(KS) on c(M, KL), leading to the encrypted codeword rho1(M, K); and the interferometer I, keyed by KS, is implementing the inverse of U(KS) through letter-by-letter decryption, followed by another unitary transformation being independent of the short-term-secure key KS.

In a development, the long-term-secure key KL is being used to select a secret code C', said secret code C' being associated with a subset of the publicly known code C; and the short-term-secure key KS is being used to perform letter-by-letter encryption on c(M, KL).

The function of KL is quantum data locking. For appropriate codes C and C' and for messages M of large size, the accessible information on M from rho1, given KS and the long-term-secure key KL, can be strongly reduced if the decoder ignores the long-term-secure key KL (that can be of size O(log|M|)), due to quantum data locking, thus leading to a private capacity between A and B.

The function of KS is letter-by-letter encryption of the quantum codeword C(M, KL). Such encryption obfuscates the structure of the codeword c(M, KL) for any attacker E and limits its capacity to conduct joint measurements on rho1(M, K) in order to learn M. On the opposite, B can use the interferometer I to perform joint detection, and can benefit from super-additive gain.

Advantageously, combining quantum data locking with KL and letter-by-letter encryption with KS simplifies the implementation of quantum data locking in the ESQUIMO framework, since structured, efficiently decodable codes C'=C(KL) can be chosen, still with everlasting security.

Advantageously, combining quantum data locking with KL with letter-by-letter encryption with KS allows to perform secure communication with everlasting security, in the ESQUIMO framework, at rates higher than the private capacity of a quantum channel.

In a development, the step of encoding the classical message M into rho1(M, K) is performed on optical quantum states, wherein said optical quantum states are associated with a plurality of characteristics, said characteristics comprising: codewords in C are product states of N coherent states over a N bosonic modes, a bosonic mode being chosen from the list comprising a time mode, a frequency mode and a spatial mode; the alphabet of the code C is composed of m-ary phase shift keying coherent states, with $m=2^p$, each letter being of the form $\{|exp(i\ 2\ Pi\ k/m)\ alpha>, k=0 \ldots m-1\}$, with fixed and photon number $|alpha^2|$ much smaller than 1; the letter-by-letter encryption of c(M, KL) with KS comprises a phase encryption step, wherein the short-term-secure key KS is used to derive the value of N independent phase shifts, applied letter-by-letter on the N coherent states of the codeword, wherein said phase-shifts are encoded with p=log 2(m) bits, the size of KS being therefore p*N.

In a development, the interferometer I, controlled by B, is associated with at least one of the characteristics comprising I is a N-mode bosonic interferometer composed of beam splitters and phase shifters; at least one phase-shift is controlled by a phase modulator, said phase modulator being configured to apply said m-ary phase shift, with $m=2^p$, and a value depending on the short-term-secure key KS; given the short-term-secure key KS, the interferometer I is configured to implement phase decryption and to transform rho2(M, K) into rho3(M, KL), the structure of the interferometer I is chosen such that rho3(M, KL) corresponds to a single-mode state in the absence of noise on the public channel F, thereby g allowing to use single-mode optical detectors to perform the measurement on rho3(M, KL).

In a development, the method comprises using a repeater station, said repeater station comprising an amplifier placed on the quantum channel which is compensating for propagation losses, wherein in an embodiment said repeater station has either no knowledge of K=(KS, KL), or in another embodiment is given a partial access to the short-term secure key KS.

Such amplifier constitutes an untrusted repeater. Given rho1(K, M) and partial access to KS, the accessible information of the repeater on M is bounded below the accessible information of M, leading to a secret capacity between A and B, with respect to any attacker, including the repeater station, that thus does not need to be trusted. In some embodiments, the alphabet is quaternary phase shift keying (QPSK), corresponding to p=2 and letter can be described by two bits, b1 encoding a Pi phase shift, and b2 encoding a Pi/2 phase shift. Conversely, Ks contains two bits c1 and c2 to encrypt the phase, for each of the N coherent states within the codeword C(M, KL). In this case and when phase sensitive amplifiers are used in a repeater, the value of N values of c2 must be sent to the repeater station so that a Pi/2 phase shift can be applied on each mode where c2=1, before performing phase-sensitive amplification on the N modes.

In an embodiment (specific protocol): M is a 1 bit message b; the quantum channel is a bosonic lossy channel, of transmittivity $T=t^2$ in power; the code C used is a [N, 2, N], (length, number of codewords, minimal distance) repetition code over a m-ary PSK alphabet with m=2 or 4; the letter-by-letter phase encryption with KS consists in using the log 2(m)*N bits of KS to perform one-time-pad encryption of the phase of each coherent state, said phase being described by log 2(m) bits for each coherent state; the interferometer I is a binary tree of depth log 2(N), coherently adding the amplitude of N coherent states, into one single mode; the optical detectors comprise phase-sensitive detectors, phase-locked with A, said phase-sensitive detector being selected from the group comprising a homodyne detector, a heterodyne detector, a Kennedy receiver, a Bondurant receiver or a Dolinar receiver; the amplifiers used within repeater stations comprise sensitive amplifiers PSA, phase locked with A and B; the value alpha, N, the position and the gain of the amplifier are optimized for a given value of T. When m=4, half of the bits of KS (encoding for the PI/2 phase) are sent to the repeater so that appropriate Pi/2 phase rotations can be applied before amplification.

When O(N) phase shifts are properly set the interferometer can coherently add the amplitude of N coherent states, into one mode, leading to the output state $[(-1)^b\ t\ sqrt(N)\ alpha>$.

If one repeater station is used, the PSA is advantageously placed in the middle of the A-B channel (equivalent loss sqrt(T)) and its gain in intensity is set to 1/sqrt(T).

In an embodiment (specific protocol): M is a 1 bit message b; the quantum channel is a bosonic lossy channel, of transmittivity $T=t^2$ in power; the code used C is composed of two codewords, from a Hadamard code of length N unitarily equivalent to pulse-position-encoding over two output, the alphabet for C is a m-ary PSK alphabet with m=2 or 4; the letter-by-letter phase encryption with KS consists in using the log 2(m)*N bits of KS to perform one-time-pad encryption of the phase of each coherent state, said phase being described by log 2(m) bits for each coherent state; the interferometer I is a binary tree of depth log 2(N), coherently adding the amplitude of N coherent states into a mode of power $t^2\ N\ alpha$; the optical detectors consist in phase insensitive sensitive detectors, said phase-sensitive detector being selected from the group comprising a single-photon detector, a photodiode or a heterodyne detector; the amplifiers used within repeater stations are phase insensitive amplifier PIA compensating for propagation losses; the value alpha and N, the position and the gain of the amplifier are optimized for a given value of T.

When O(N) phase shifts are properly set the interferometer can coherently add the amplitude of the N coherent states, leading to concentrate the output power $t^2\ N\ alpha$ into mode b.

In a development, the step of sharing the short-term-secure key KS between A and B is performed using computationally secure techniques, by using one or more of the mechanisms comprising a secret-key cryptographic mechanism and/or a public-key mechanism.

In an embodiment, the mechanism is a secret-key mechanism. An initial shared secret key, K=K1||Kauth is shared between A and B and secure at the time of. A and B authenticate their communication and KS is derived from K1 by performing key expansion with a symmetric technique (for example using AES_K1 in counter mode)].

In an embodiment, the mechanism is a public-key mechanism. Assuming short-term security of public-key cryptography, public-key encryption can be used for key distribution of KS. The method of claim 1 can then be used in an open network, still with everlasting security.]

In a development, the step of sharing the long-term secure key KL between A and B is performed using long-term secure mechanisms, said mechanisms comprising using long-term-secret random message or keys, previously exchanged between A and B using the steps of claim 1 for key distribution with everlasting security and/or quantum key distribution and/or trusted courier.

There is disclosed a computer program product comprising code instructions which when executed on a computer perform the steps of any one of the claims 1 to 10.

There is disclosed a system comprising means to perform one or more steps of the method.

In a development, the system comprises: a security perimeter for A (A) wherein secure data (KS, KL) are stored; a security perimeter for B (B) wherein secure data (KS, KL) are stored; a source of coherent light (S), emitting in at least in N modes; an optional demultiplexer (D) that can separate each or part of the N modes; single-mode phase modulator devices (PM), controlled by A, acting on each of the N modes; an optional N-mode multiplexer (M) that can combine each or part of the N modes; at least one optical quantum channel F from A to B; an optional demultiplexer (D) that can separate each or part of the N modes; a N-mode interferometer I composed of beamsplitter and of phase-shifters, some actively controlled by B; and single-mode optical detectors (SMD).

In a development, the system comprises: a laser emitting coherent light in N modes; a phase modulator placed on each of the N modes, which modulates the state of each mode within a m-ary phase shift keying constellation of coherent states; the applied phase modulation depends on KS and KL, leading to the N-mode encrypted codeword rho1(M, K); at least one optical quantum channel from A to B; a N-mode interferometer composed of beam-splitters and actively controlled phase-shifters; optical detectors at B; and computing means at A and B.

In a development, the system according to the invention and implementing one or more steps of the method comprises one or more of: a laser emitting coherent light in N modes; a phase modulator placed on each of the N modes, which modulates the phase shifts encrypted by KS, {Theta1, Theta2, . . . ThetaN} together with the BPSK encoding of c(M, KL), leading to the N-mode codeword rho1(M, K); at least one optical quantum channel from A to B; a N-mode interferometer composed of beam-splitters and actively controlled phase-shifters; optical detectors at B; computing means at A and B.

In some embodiments; optical CDMA techniques can be used to implement embodiments of the invention. In some embodiments, OFDM techniques can be used, in particular relying on spectral encoding and on a mode-locked laser. In some embodiments, the optical encoding can be performed over multiple spatial modes, combined with spatial light modulators.

In a development, the system according to the invention comprises one or more of: a mode-locked laser pulsed laser and/or a continuous ware laser; a phase modulator and/or an amplitude modulator; an optical switch; a phase-sensitive amplifier and/or a phase-insensitive amplifier; a WDM filter and/or combiner, and/or an add-drop multiplexer; a Time-delay interferometer and/or an Optical Fast Fourier Transform interferometer; one or more detectors selected from the group comprising a single photon detector, an homodyne detector, an heterodyne detector, a Kennedy receiver, a Dolinar receiver, a Bondurant receiver or a quantum-nulling receiver.

The invention claimed is:

1. A method of communicating a classical message M between distant parties A and B over a lossy and/or noisy public channel F connecting A and B, comprising the steps of:
   sharing a key K between A and B, said key K comprising a short-term-secure key KS or a long-term-secure key KL;
   encoding at A the classical message M as a quantum codeword, A using the shared key to encode the classical message M into an encrypted codeword rho1(M, K) belonging to a publicly known quantum code C;
   communicating the encrypted codeword rho1(M, K) from A to B over the channel F whose output is codeword rho2(M, K);
   unitarily transforming rho2(M, K) into rho3(M, K) by using a N-mode interferometer I controlled by B placed at the output of channel F and keyed by K; and
   determining an estimate, Mest, of M, locally at B, based on rho3(M, K).

2. The method of claim 1, wherein the step of encoding M into the encrypted codeword rho1(M, KS, KL) comprises the steps of encoding M into a codeword c(M, KL) belonging to a publicly known quantum code C and of using the short-term-secure key KS to perform letter-by-letter encryption U(KS) on c(M, KL), leading to the encrypted codeword rho1 (M, K); and
   wherein the interferometer I, keyed by KS, is implementing the inverse of U(KS) through letter-by-letter decryption, followed by another unitary transformation being independent of the short-term-secure key KS.

3. The method of claim 1, wherein the long-term-secure key KL is being used to select a secret code C', said secret code C' being associated with a subset of the publicly known code C; and
   wherein the short-term-secure key KS is being used to perform letter-by-letter encryption on c(M, KL).

4. The method of claim 1, wherein the step of encoding the classical message M into rho1 (M, K) is performed on optical quantum states, wherein said optical quantum states are associated with a plurality of characteristics, said characteristics comprising:
   codewords in C are product states of N coherent states over a N bosonic modes, a bosonic mode being chosen from the list comprising a time mode, a frequency mode and a spatial mode;
   the alphabet of the code C is composed of m-ary phase shift keying coherent states, with m=2p, each letter being of the form {|exp(i 2 Pi k/m) alpha>, k=0 . . . m−1}, with fixed and photon number |alpha^2| much smaller than 1;
   the letter-by-letter encryption of c(M, KL) with KS comprises a phase encryption step, wherein the short-term-secure key KS is used to derive the value of N independent phase shifts, applied letter-by-letter on the N coherent states of the codeword, wherein said phase-shifts are encoded with p=log 2(m) bits, the size of KS being therefore p*N.

5. The method of claim 4, wherein a repeater station, comprising an amplifier placed on the quantum channel is compensating for propagation losses, wherein said repeater station has either no knowledge of K=(KS, KL) or is given a partial access to the short-term secure key KS.

6. The method of claim 4, wherein:
M is a 1 bit message b,
the quantum channel is a bosonic lossy channel, of transmittivity T=t^2 in power;
the code C used is a [N, 2, N], (length, number of codewords, minimal distance) repetition code over a m-ary PSK alphabet with m=2 or 4;
letter-by-letter phase encryption with KS consists in using the log 2(m)*N bits of KS to perform one-time-pad encryption of the phase of each coherent state, said phase being described by log 2(m) bits for each coherent state;
the interferometer I is a binary tree of depth log 2(N), coherently adding the amplitude of N coherent states, into one single mode;
the optical detectors comprise phase-sensitive detectors, phase-locked with A, said phase-sensitive detector being selected from the group comprising a homodyne detector, a heterodyne detector, a Kennedy receiver, a Bondurant receiver or a Dolinar receiver;
the amplifiers used within repeater stations comprise sensitive amplifiers PSA, phase locked with A and B;
the value alpha, N, the position and the gain of the amplifier are optimized for a given value of T.

7. The method of claim 4, wherein:
M is a 1 bit message b,
the quantum channel is a bosonic lossy channel, of transmittivity T=t^2 in power;
the code used C is composed of two codewords, from a Hadamard code of length N unitarily equivalent to pulse-position-encoding over two output, the alphabet for C is a m-ary PSK alphabet with m=2 or 4;
letter-by-letter phase encryption with KS consists in using the log 2(m)*N bits of KS to perform one-time-pad encryption of the phase of each coherent state, said phase being described by log 2(m) bits for each coherent state;
the interferometer I is a binary tree of depth log 2(N), coherently adding the amplitude of N coherent states into a mode of power t^2 N alpha;
the optical detectors consist in phase insensitive sensitive detectors, said phase-sensitive detector being selected from the group comprising a single-photon detector, a photodiode or a heterodyne detector;
the amplifiers used within repeater stations are phase insensitive amplifier PIA compensating for propagation losses;
the value alpha and N, the position and the gain of the amplifier are optimized for a given value of T.

8. The method of claim 1, wherein the step of sharing the short-term-secure key KS between A and B is performed using computationally secure techniques, by using one or more of the mechanisms comprising a secret-key cryptographic mechanism and/or a public-key mechanism.

9. The method of claim 1, wherein the step of sharing the long-term secure key KL between A and B is performed using long-term secure mechanisms, said mechanisms comprising using long-term-secret random message or keys, previously exchanged between A and B using the steps of claim 1 for key distribution with everlasting security and/or quantum key distribution and/or trusted courier.

10. The method of claim 1, wherein the estimate, Mest, is determined by performing a measurement on rho3(M, K) and by processing said measurement using the shared key K.

11. The method of claim 10, wherein the interferometer I, controlled by B, is associated with at least one of the characteristics comprising:
I is a N-mode bosonic interferometer composed of beam-splitters and phase-shifters;
at least one phase-shift is controlled by a phase modulator, said phase modulator being configured to apply said m-ary phase shift, with m=2^p, and a value depending on the short-term-secure key KS;
given the short-term-secure key KS, the interferometer I is configured to implement phase decryption and to transform rho2(M, K) into rho3(M, KL),
the structure of the interferometer I is chosen such that rho3(M, KL) corresponds to a single-mode state in the absence of noise on the public channel F, thereby g allowing to use single-mode optical detectors to perform the measurement on rho3(M, KL).

12. A computer program product comprising code instructions which when executed on a computer perform, for communicating a classical message M between distant parties A and B over a lossy and/or noisy public channel F connecting A and B, the steps of:
sharing a key K between A and B, said key K comprising a short-term-secure key KS or a long-term-secure key KL;
encoding at A the classical message M as a quantum codeword, A using the shared key to encode the classical message M into an encrypted codeword rho1(M, K) belonging to a publicly known quantum code C;
communicating the encrypted codeword rho1(M, K) from A to B over the channel F whose output is codeword rho2(M, K);
unitarily transforming rho2(M, K) into rho3(M, K) by using a N-mode interferometer I controlled by B placed at the output of channel F and keyed by K; and
determining an estimate, Mest, of M, locally at B, based on rho3(M, K).

13. A system comprising means to perform, for communicating a classical message M between distant parties A and B over a lossy and/or noisy public channel F connecting A and B, the steps of:
sharing a key K between A and B, said key K comprising a short-term-secure key KS or a long-term-secure key KL;
encoding at A the classical message M as a quantum codeword, A using the shared key to encode the classical message M into an encrypted codeword rho1(M, K) belonging to a publicly known quantum code C;
communicating the encrypted codeword rho1(M, K) from A to B over the channel F whose output is codeword rho2(M, K);
unitarily transforming rho2(M, K) into rho3(M, K) by using a N-mode interferometer I controlled by B placed at the output of channel F and keyed by K; and
determining an estimate, Mest, of M, locally at B, based on rho3(M, K).

14. The system of claim 13, comprising one or more of:
a security perimeter for A wherein secure data (KS, KL) is stored;
a security perimeter for B wherein secure data (KS, KL) are stored;
a source of coherent light, emitting in at least in N modes;

a demultiplexer configured to separate each or part of the N modes;
at least one single-mode phase modulator device, controlled by A, acting on each of the N modes;
an N-mode multiplexer configured to combine each or part of the N modes
at least one optical quantum channel F from A to B;
a demultiplexer configured to separate each or part of the N modes; a N-mode interferometer I composed of beam-splitters and/or of phase-shifters, at least one being controlled by B;
a single-mode optical detector.

15. The system of claim 13, comprising:
a laser emitting coherent light in N modes;
a phase modulator placed on each of the N modes, which modulates the state of each mode within a m-ary phase shift keying constellation of coherent states; the applied phase modulation depends on KS and KL, leading to the N-mode encrypted codeword rho1 (M, K);
at least one optical quantum channel from A to B;
a N-mode interferometer composed of beam-splitters and actively controlled phase-shifters;
optical detectors at B;
computing means at A and B.

16. A system comprising means to perform, for communicating a classical message M between distant parties A and B over a lossy and/or noisy public channel F connecting A and B, the steps of:
sharing a key K between A and B, said key K comprising a short-term-secure key KS or a long-term-secure key KL;
encoding at A the classical message M as a quantum codeword, A using the shared key to encode the classical message M into an encrypted codeword rho1(M, K) belonging to a publicly known quantum code C;
communicating the encrypted codeword rho1(M, K) from A to B over the channel F whose output is codeword rho2(M, K);
unitarily transforming rho2(M, K) into rho3(M, K) by using a N-mode interferometer I controlled by B placed at the output of channel F and keyed by K; and
determining an estimate, Mest, of M, locally at B, based on rho3(M, K),
wherein the step of encoding the classical message M into rho1(M, K) is performed on optical quantum states, wherein said optical quantum states are associated with a plurality of characteristics, said characteristics comprising:
codewords in C are product states of N coherent states over a N bosonic modes, a bosonic mode being chosen from the list comprising a time mode, a frequency mode and a spatial mode;
the alphabet of the code C is composed of m-ary phase shift keying coherent states, with m=2^p, each letter being of the form {|exp(i 2 Pi k/m) alpha>, k=0 ... m−1}, with fixed and photon number |alpha^2| much smaller than 1;
the letter-by-letter encryption of c(M, KL) with KS comprises a phase encryption step, wherein the short-term-secure key KS is used to derive the value of N independent phase shifts, applied letter-by-letter on the N coherent states of the codeword, wherein said phase-shifts are encoded with p=log 2(m) bits, the size of KS being therefore p*N,
wherein the system comprises one or more of:
a mode-locked laser pulsed laser and/or a continuous ware laser;
a phase modulator and/or an amplitude modulator;
an optical switch;
a phase-sensitive amplifier and/or a phase-insensitive amplifier;
a WDM filter and/or combiner, and/or an add-drop multiplexer;
a Time-delay interferometer and/or an Optical Fast Fourier Transform interferometer;
one or more detectors selected from the group comprising a single photon detector, an homodyne detector, an heterodyne detector, a Kennedy receiver, a Dolinar receiver, a Bondurant receiver or a quantum-nulling receiver.

17. A method of communicating a classical message M between distant parties A and B over a lossy and/or noisy public channel F connecting A and B, comprising the steps of:
receiving, at B, an encrypted codeword rho2(M, K) from A over the channel F, said codeword having been encrypted with a key K shared between A and B, said key K comprising a short-term-secure key KS or a long-term-secure key KL, wherein rho2(M, K) is output from channel F based on input codeword rho1(M, K) that belongs to a publicly known quantum code C, and wherein the codeword rho1(M, K) has been encrypted by encoding a classical message M using the shared key;
unitarily transforming rho2(M, K) into rho3(M, K) by using an N-mode interferometer I controlled by B placed at the output of channel F and keyed by K; and
determining an estimate, Mest, of M, locally at B, based on rho3(M, K).

18. A method of communicating a classical message M between distant parties A and B over a lossy and/or noisy public channel F connecting A and B, comprising the steps of:
encoding at A the classical message M as a quantum codeword using a key K shared between A and B, said key K comprising a short-term-secure key KS or a long-term-secure key KL, A using the shared key to encode the classical message M into an encrypted codeword rho1(M, K) belonging to a publicly known quantum code C; and
communicating the encrypted codeword rho1(M, K) from A to B over the channel F whose output is codeword rho2(M, K) such that (i) an N-mode interferometer I controlled by B placed at the output of channel F and keyed by K is capable of unitarily transforming rho2(M, K) into rho3(M, K) (ii) an estimate, Mest, of M is capable of being locally determined at B based on rho3(M, K).

* * * * *